United States Patent
Nishikawa et al.

(10) Patent No.: US 10,546,683 B2
(45) Date of Patent: Jan. 28, 2020

(54) COIL COMPONENT

(71) Applicant: TDK CORPORATION, Tokyo (JP)

(72) Inventors: Tomonaga Nishikawa, Tokyo (JP); Kouji Kawamura, Tokyo (JP); Hidenori Tsutsui, Tokyo (JP); Mitsuo Natori, Tokyo (JP); Hitoshi Ozawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 119 days.

(21) Appl. No.: 15/947,682

(22) Filed: Apr. 6, 2018

(65) Prior Publication Data

US 2018/0294090 A1    Oct. 11, 2018

(30) Foreign Application Priority Data

Apr. 11, 2017  (JP) ................. 2017-078275

(51) Int. Cl.
*H01F 27/29* (2006.01)
*H01F 5/00* (2006.01)
*H02M 7/00* (2006.01)

(52) U.S. Cl.
CPC ............. *H01F 27/29* (2013.01); *H01F 5/003* (2013.01); *H01F 2005/006* (2013.01); *H02M 7/003* (2013.01)

(58) Field of Classification Search
CPC .................. H01F 27/00–36; H01F 5/00
USPC ..................... 336/65, 83, 192, 200, 232–234
See application file for complete search history.

(56) References Cited

U.S. PATENT DOCUMENTS

| | | | |
|---|---|---|---|
| 5,583,424 A | * | 12/1996 | Sato ................. G05F 1/575 323/282 |
| 2011/0279100 A1 | | 11/2011 | Ikriannikov |
| 2018/0075965 A1 | * | 3/2018 | Yoshioka ............ H01F 27/2823 |
| 2019/0115150 A1 | * | 4/2019 | Yoshioka .............. H01F 41/046 |
| 2019/0244743 A1 | * | 8/2019 | Hirai .................... H01F 41/12 |

FOREIGN PATENT DOCUMENTS

| | | |
|---|---|---|
| JP | 2013526787 A | 6/2013 |
| JP | 2015130472 A | 7/2015 |

* cited by examiner

*Primary Examiner* — Tuyen T Nguyen
(74) *Attorney, Agent, or Firm* — Young Law Firm, P.C.

(57) ABSTRACT

Disclosed herein is a coil component that includes a spiral conductor, a magnetic material layer covering the spiral conductor and having a through hole exposing an end of the spiral conductor, a through-hole conductor embedded in the through hole and has first region and second regions that are exposed from the magnetic material layer, a first conductor layer formed on an upper surface of the magnetic material layer and covering the first region of the through-hole conductor without covering the second region, and a second conductor layer covering the first conductor layer and the second region of the through-hole conductor, wherein the second conductor layer has a lower resistance than the first conductor layer.

10 Claims, 8 Drawing Sheets

COIL COMPONENT

BACKGROUND OF THE INVENTION

Field of the Invention

The present invention relates to a coil component, and particularly relates to a coil component that has an external terminal provided on a bottom face thereof.

Description of Related Art

A coil component referred to as a coupling inductor is used in some cases as a smoothing coil for a switching power supply such as a DC/DC converter. The coupling inductor is formed by magnetically coupling windings that are wound in opposite directions to each other, as described in Japanese Patent Application National Publication No. 2013-526787 and Japanese Patent Application Laid-open No. 2015-130472. In this technique, when a current flows through one winding, a current also flows through the other winding due to electromotive force. Therefore, when the coil component is used as a smoothing coil for a switching power supply, the peak of an inrush current can be reduced.

In a coil component described in Japanese Patent Application National Publication No. 2013-526787, the windings are formed of a wire or foil. FIG. 32 of this publication discloses a configuration in which ends of two windings are connected to a common external terminal. Japanese Patent Application Laid-open No. 2015-130472 discloses a coil component in which planar spiral conductors are formed on upper and lower surfaces of an insulating substrate.

However, in the coil component disclosed in Japanese Patent Application National Publication No. 2013-526787, because the windings are formed of a wire or foil, the manufacturing process thereof becomes complicated and properties to be obtained vary largely.

On the other hand, the coil component described in Japanese Patent Application Laid-open No. 2015-130472 exhibits small variation in properties due to the use of planar spiral conductors as windings. However, in Japanese Patent Application Laid-open No. 2015-130472, because two planar spiral conductors are concentrically wound, there is a problem of difficulty in adjusting a magnetic coupling rate. That is, in order to obtain desired properties in a coupling inductor, because leakage flux components that do not magnetically couple cause a smoothing effect, it is necessary to decrease a magnetic coupling rate to some extent and to ensure sufficient leakage flux components. However, in order to decrease a magnetic coupling rate in the coil component described in Japanese Patent Application Laid-open No. 2015-130472, it is necessary to widen the interval between the two concentrically wound planar spiral conductors. In this case, the planar size of an end product becomes large. Further, because it is necessary to form an external terminal on a side face of the component, there is also a problem that short circuit with other adjacent components tends to occur in a case of high-density implementation.

In order to solve such problems, some members of the present inventors have proposed a configuration in which two planar spiral conductors are stacked and inner peripheral ends of these planar spiral conductors are connected in common. According to this configuration, because the two planar spiral conductors are magnetically coupled to each other in a stacking direction, the magnetic coupling rate can be adjusted without affecting the planar size of an end product. Because the inner peripheral ends of the two planar spiral conductors are coupled to each other, it is not necessary to short-circuit the inner peripheral ends on a circuit board. Because only a small number of terminals is required, an eddy current loss caused by terminal parts is small. Further, it is not necessary to form external terminals on a side surface of the component, and can be formed only on a bottom face thereof. Thus, there is also an advantage that short circuit with other components hardly occurs even in a case of high-density implementation.

However, in recent years, accompanying requirements in further downsizing of the chip size of a coil component, it is becoming difficult to secure a sufficient volume of a magnetic material layer that covers a planar spiral conductor. That is, when a bump-shaped bottom electrode is used, because the volume of the magnetic material layer decreases by the volume of the bottom electrode, it is difficult to obtain desired magnetic properties as downsizing of coil components proceeds. In order to secure a sufficient volume of the magnetic material layer, it suffices to reduce the diameter of the bump-shaped bottom electrode. However, in this case, because an exposed area of the bottom electrode decreases, there is a concern for reduction in connection reliability.

SUMMARY

It is therefore an object of the present invention to provide a coil component that can secure a sufficient volume of a magnetic material layer, while an exposed area of a bottom electrode is enlarged.

A coil component according to the present invention includes a spiral conductor, a magnetic material layer covering the spiral conductor and having a through hole exposing an end of the spiral conductor, a through-hole conductor embedded in the through hole and has first region and second regions that are exposed from the magnetic material layer, a first conductor layer formed on an upper surface of the magnetic material layer and covering the first region of the through-hole conductor without covering the second region, and a second conductor layer covering the first conductor layer and the second region of the through-hole conductor, wherein the second conductor layer has a lower resistance than the first conductor layer.

According to the present invention, because the first and second conductor layers are provided on the upper surface of the magnetic material layer, an exposed area of a bottom electrode can be ensured even when the diameter of the through-hole conductor is reduced. Further, because the through-hole conductor has a portion connected to the second conductor layer having a lower resistance without interposition by the first conductor layer, an increase in DC resistance can be suppressed.

In the present invention, it is preferable that the first conductor layer has higher flexibility than the second conductor layer. Accordingly, the first conductor layer provides flexibility to the bottom electrode, by which thermal shock and external stress can be reduced, thereby increasing reliability. It is preferable that conductive resin such as silver paste is used as a material of the first conductor layer. It is preferable that the magnetic material layer is formed of resin containing a magnetic material. Accordingly, adhesion between the magnetic material layer and the first conductor layer can be increased.

In the present invention, it is preferable that the second conductor layer is constituted of stacked films of nickel (Ni) and tin (Sn). Accordingly, low resistance as well as high thermal resistance and high wettability with respect to solder can be achieved.

In the present invention, the second region can have a larger area than the first region. Accordingly, DC resistance can be reduced further. The second region can be located closer to an end of the magnetic material layer than the first region as viewed in a stacking direction. With this configuration, the first conductor layer is not interposed in a portion corresponding to the shortest route of a current path, and therefore DC resistance can be reduced even further.

In the present invention, it is preferable that the spiral conductor includes a first planar spiral conductor, and a second planar spiral conductor that is stacked on the first planar spiral conductor and wound in an opposite direction to a winding direction of the first planar spiral conductor, wherein the through-hole conductor includes a first through-hole conductor connected to an outer peripheral end of the first planar spiral conductor, a second through-hole conductor connected to an outer peripheral end of the second planar spiral conductor, and a third through-hole conductor connected in common to inner peripheral ends of the first and second planar spiral conductors. With this configuration, a high-performance coupling inductor can be obtained.

In the present invention, it is preferable that the inner peripheral ends of the first and second planar spiral conductors overlap as viewed in a stacking direction, and are coupled to each other in the stacking direction at overlapped positions. With this configuration, a connecting conductor or the like for connecting the inner peripheral ends is not necessary, and therefore the configuration can be simplified.

In this case, it is preferable that the third through-hole conductor overlaps at least partially with the inner peripheral ends of the first and second planar spiral conductors as viewed in the stacking direction. With this configuration, a connecting conductor or the like for connecting the inner peripheral ends of the planar spiral conductors and the third through-hole conductor is not necessary, and therefore the configuration can be simplified. Further, because the third through-hole conductor is arranged immediately above the inner peripheral ends, a high heat dissipation effect can also be obtained.

According to the present invention as described above, it is possible to provide a coil component that can secure a sufficient volume of a magnetic material layer, while an exposed area of a bottom electrode is enlarged.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Preferred embodiments of the present invention will now be explained in detail with reference to the drawings.

Figure 1:
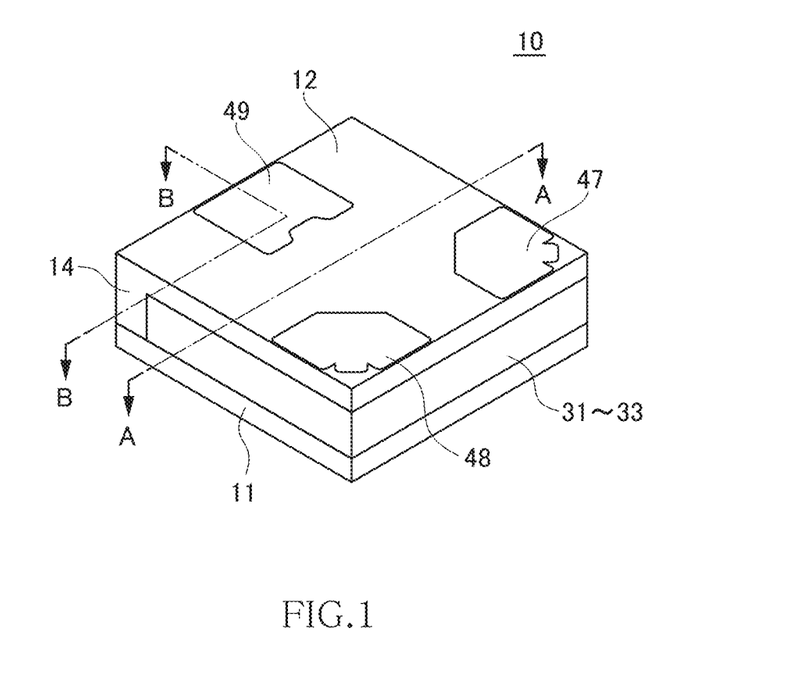
FIG. 1 is a perspective view illustrating an external appearance of a coil component according to a preferred embodiment of the present invention.
Figure 2:
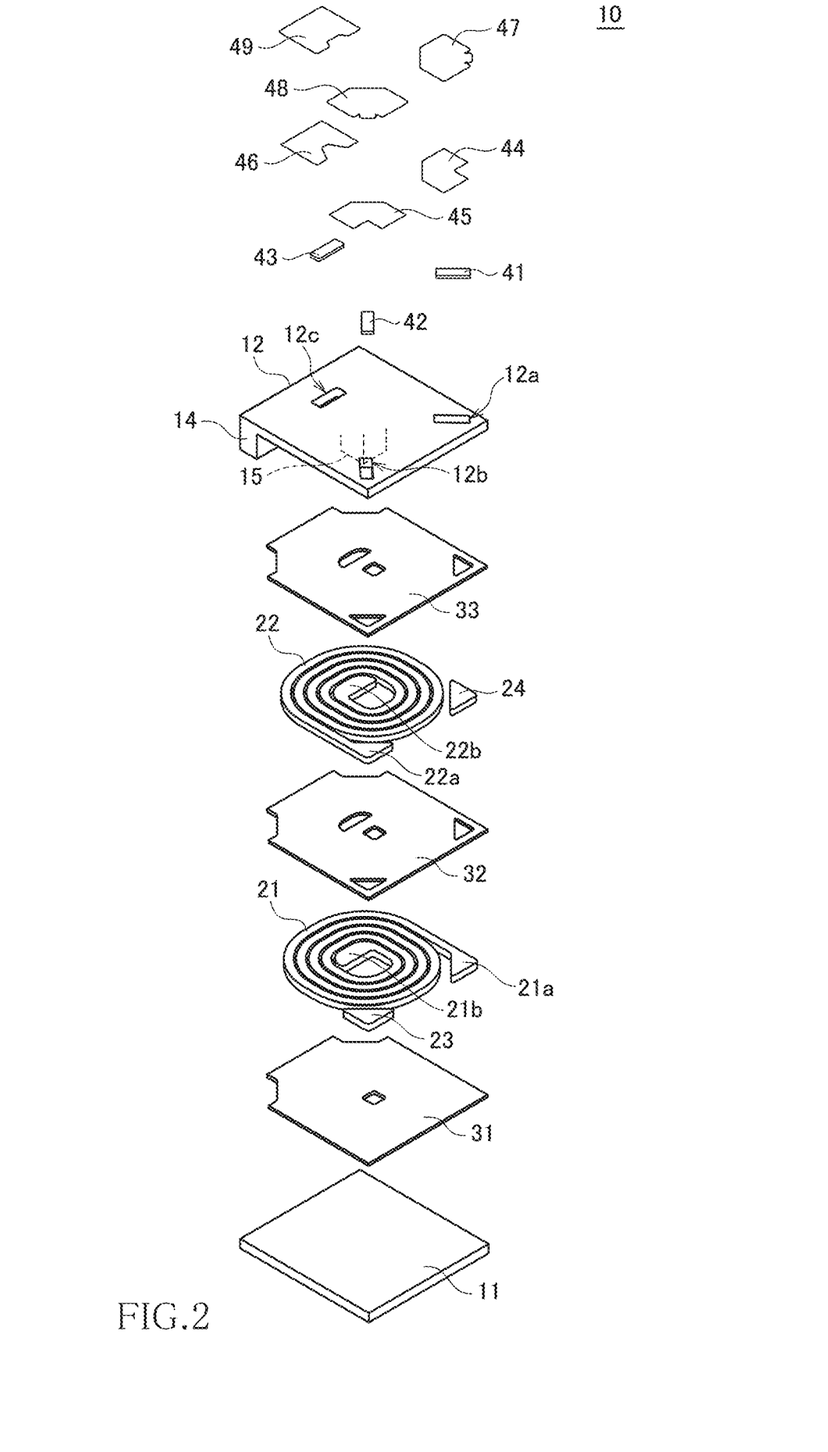
FIG. 2 is an exploded perspective view of the coil component shown in FIG. 1.
Figure 3:
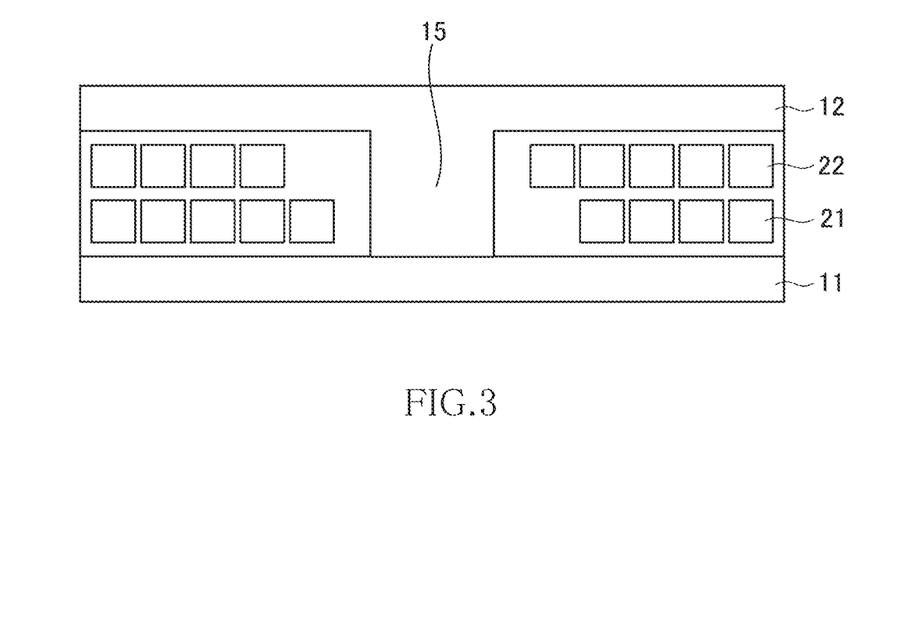
FIG. 3 is a cross-sectional view taken along a line A-A in FIG. 1.
Figure 4:
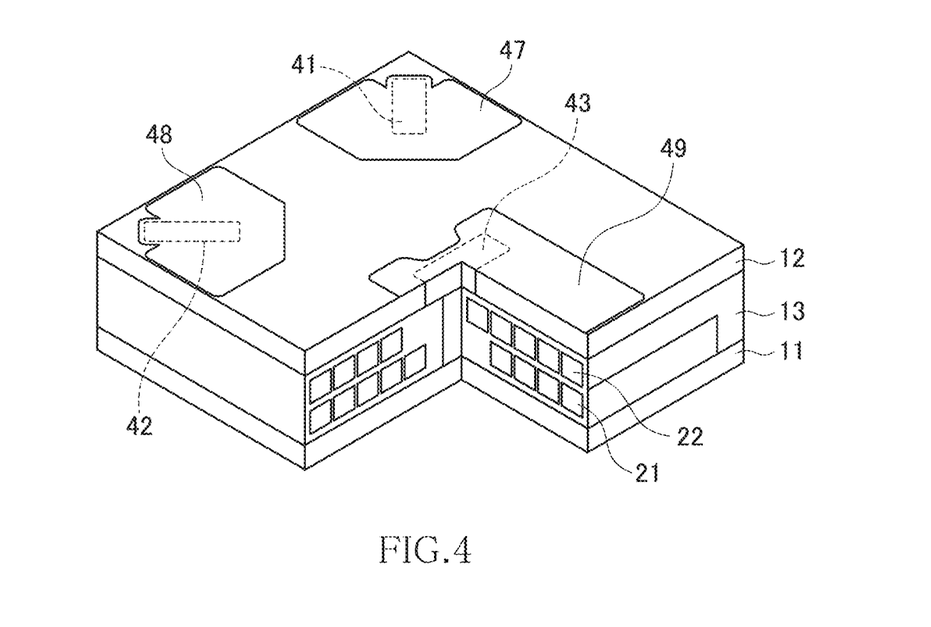
FIG. 4 is a cross-sectional view taken along a line B-B in FIG. 1.

FIG. 1 is a perspective view illustrating an external appearance of a coil component 10 according to a preferred embodiment of the present invention. FIG. 2 is an exploded perspective view of the coil component 10, FIG. 3 is a cross-sectional view taken along a line A-A in FIG. 1, and FIG. 4 is a cross-sectional view taken along a line B-B in FIG. 1.

The coil component 10 according to the present embodiment is a chip component that can be used as a coupling inductor. As illustrated in FIG. 1 to FIG. 4, the coil component 10 includes first and second magnetic material layers 11 and 12, and first and second planar spiral conductors 21 and 22 sandwiched by the magnetic material layers 11 and 12.

The magnetic material layer 11 is a substrate formed of a magnetic material such as sintered ferrite. As described below, in a manufacturing process of the coil component 10, the magnetic material layer 11 is used as a substrate, and the planar spiral conductors 21 and 22 and the magnetic material layer 12 are formed sequentially on an upper surface thereof. The magnetic material layer 12 is a composite formed of resin containing ferrite powder or metal magnetic powder. When metal magnetic powder is used, a permalloy material is preferably used. As the resin, liquid or powder epoxy resin is preferably used.

The first planar spiral conductor 21 is formed above the upper surface of the magnetic material layer 11 with an insulating layer 31 interposed therebetween. The planar spiral conductor 21 is wound counterclockwise (leftward) from an outer peripheral end 21a to an inner peripheral end 21b as viewed in a stacking direction. The number of turns of windings is 4.5, for example, although not particularly limited thereto. A connecting conductor 23 is also formed in the same conductor layer where the planar spiral conductor 21 is located. The connecting conductor 23 is provided independently from the planar spiral conductor 21. The outer peripheral end 21a and the inner peripheral end 21b have a conductor width that is sufficiently larger than other portions thereof.

The second planar spiral conductor 22 is formed above an upper surface of the first planar spiral conductor 21 with an insulating layer 32 interposed therebetween. The planar spiral conductor 22 is wound clockwise (rightward) from an outer peripheral end 22a to an inner peripheral end 22b as viewed in a stacking direction. That is, the winding directions of the planar spiral conductors 21 and 22 are opposite to each other. The number of turns of windings is preferably the same as that of the first planar spiral conductor 21. A connecting conductor 24 is also formed in the same conductor layer where the planar spiral conductor 22 is located. The connecting conductor 24 is provided at a position overlapping with the outer peripheral end 21a of the planar spiral conductor 21, and is coupled to the outer peripheral end 21a via a through hole formed in the insulating layer 32. Similarly, the connecting conductor 23 described above is provided at a position overlapping with the outer peripheral end 22a of the planar spiral conductor 22. The connecting conductor 23 and the outer peripheral end 22a of the planar spiral conductor 22 can be either connected or not connected to each other. The outer peripheral end 22a and the inner peripheral end 22b have a conductor width that is sufficiently larger than other portions thereof.

The inner peripheral end 21b of the planar spiral conductor 21 and the inner peripheral end 22b of the planar spiral conductor 22 are arranged at same planar positions as viewed in the stacking direction, and are coupled to each other via a through hole formed in the insulating layer 32. It is not necessary that the planar positions of the inner peripheral ends 21b and 22b of the planar spiral conductors 21 and 22 completely match with each other, and it suffices that there is an overlapping portion at least at positions where they are short-circuited to each other.

The planar spiral conductors 21 and 22 and the connecting conductors 23 and 24 are all formed of a good conductor such as copper (Cu), and are preferably formed by electrolytic plating.

An upper surface of the planar spiral conductor 22 is covered with the second magnetic material layer 12 with an insulating layer 33 interposed therebetween. Three through holes 12a to 12c are provided in the magnetic material layer 12, and first to third through-hole conductors 41 to 43 are embedded in the through holes 12a to 12c, respectively. The through holes 12a to 12c have a shape that penetrates an inside portion away from an outer peripheral portion of the magnetic material layer 12. That is, inner peripheral walls of the through holes 12a to 12c do not constitute an outer peripheral wall of the magnetic material layer 12, and therefore the through-hole conductors 41 to 43 are not exposed from a side surface of the magnetic material layer 12.

The through hole 12a is located immediately above the connecting conductor 24 and exposes at least a portion of the connecting conductor 24. Accordingly, the first through-hole conductor 41 embedded in the through hole 12a is connected to the outer peripheral end 21a of the first planar spiral conductor 21 via the connecting conductor 24.

The through hole 12b is located immediately above the outer peripheral end 22a of the second planar spiral conductor 22, and exposes at least a portion of the outer peripheral end 22a. Accordingly, the second through-hole conductor 42 embedded in the through hole 12b is connected to the outer peripheral end 22a of the second planar spiral conductor 22.

The through hole 12c is located immediately above the inner peripheral end 22b of the second planar spiral conductor 22, and exposes at least a portion of the inner peripheral end 22b. Accordingly, the third through-hole conductor 43 embedded in the through hole 12c is connected in common to the inner peripheral ends 21b and 22b of the first and second planar spiral conductors 21 and 22.

The through-hole conductors 41 to 43 are formed of a good conductor such as copper (Cu), similarly to the planar spiral conductors 21 and 22. In the present embodiment, the through-hole conductors 41 to 43 and the planar spiral conductors 21 and 22 are formed of the same metal material.

Upper surfaces of the through-hole conductors 41 to 43 are exposed from an upper surface of the second magnetic material layer 12, and constitute a plane that is substantially flush with the upper surface of the second magnetic material layer 12. As described above, the through-hole conductors 41 to 43 are not exposed from a side surface of the magnetic material layer 12, and are exposed only from the upper surface of the second magnetic material layer 12. When the coil component 10 according to the present embodiment is implemented on a surface of a printed circuit board, it is turned upside down and implemented so that the upper surface of the second magnetic material layer 12 faces the printed circuit board. Thus, the through-hole conductors 41 to 43 exposed from the upper surface of the second magnetic material layer 12 constitute a part of a bottom electrode of the coil component 10.

The upper surface of the through-hole conductors 41 to 43 are covered with first conductor layers 44 to 46, respectively, and further covered with second conductor layers 47 to 49, respectively.

Figure 5:
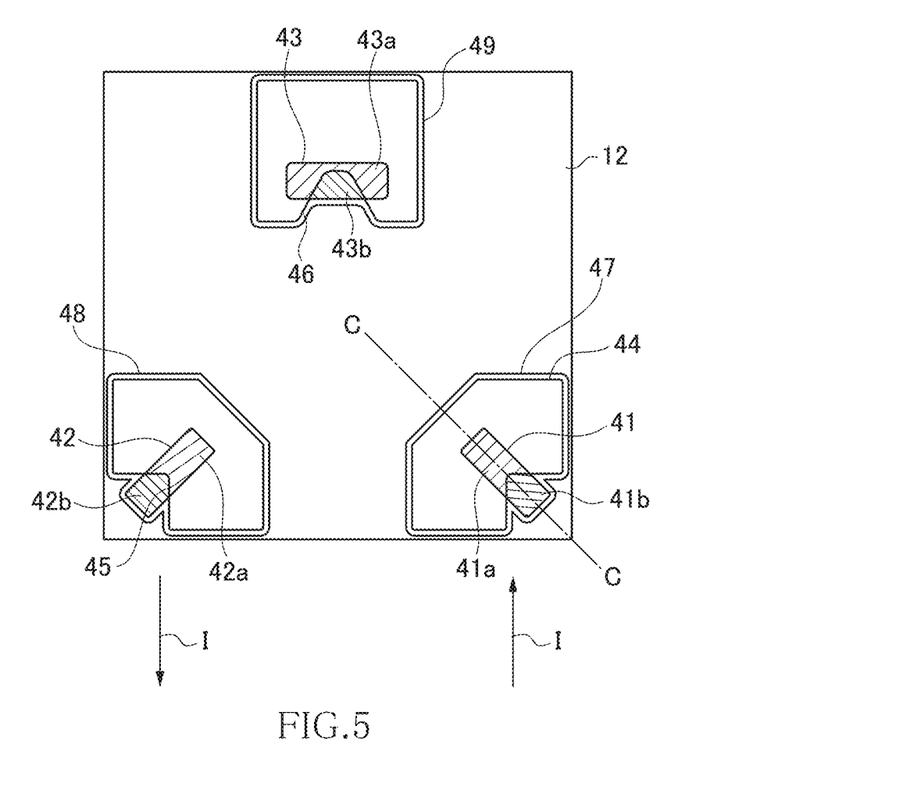
FIG. 5 is a perspective plan view for describing the layout of a bottom surface of the coil component shown in FIG. 1.
Figure 6:
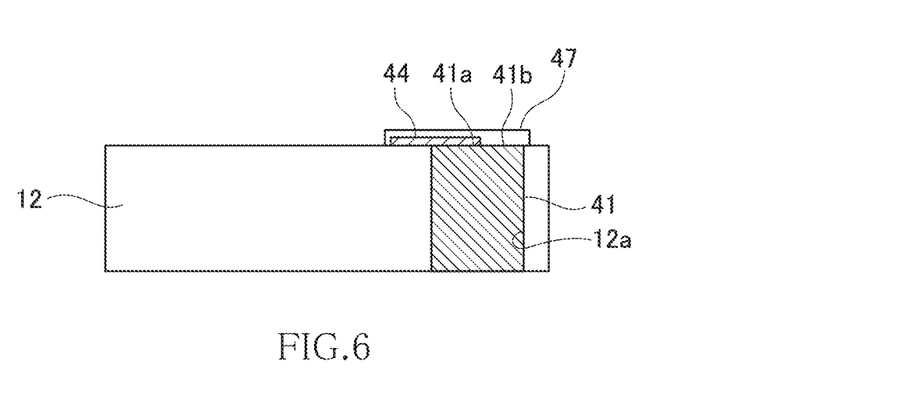
FIG. 6 is a cross-sectional view taken along a line C-C in FIG. 5.

FIG. 5 is a perspective plan view for describing the layout of a bottom surface of the coil component 10, and FIG. 6 is a cross-sectional view taken along a line C-C in FIG. 5.

As illustrated in FIG. 5 and FIG. 6, the upper surfaces of the through-hole conductors 41 to 43 respectively have first regions 41a to 43a and second regions 41b to 43b. The first conductor layers 44 to 46 are provided on the surface of the second magnetic material layer 12 to cover the first regions 41a to 43a, respectively. For the first conductor layers 44 to 46, conductive resin such as silver paste is preferably used. With such resin, as compared to a case where metal such as nickel (Ni) or tin (Sn) is used as the material of the first conductor layers 44 to 46, high adhesion to the second magnetic material layer 12 can be obtained, and thermal shock and external stress can be reduced by high flexibility of the conductive resin, thereby increasing reliability.

The first conductor layers 44 to 46 cover not only the first regions 41a to 43a of the through-hole conductors 41 to 43 but also a portion of the surface of the second magnetic material layer 12, thereby functioning to enlarge the area of the bottom electrode. However, the first conductor layers 44 to 46 do not cover the second regions 41b to 43b of the through-hole conductors 41 to 43, and thus the second regions 41b to 43b are exposed from the first conductor layers 44 to 46.

The second regions 41b to 43b of the through-hole conductors 41 to 43 and the first conductor layers 44 to 46 are covered with the second conductor layers 47 to 49, respectively. The second conductor layers 47 to 49 constitute an outermost layer of the bottom electrode, and need to have lower resistance than at least the first conductor layers 44 to 46. As the material of the second conductor layers 47 to 49, stacked films of nickel (Ni) and tin (Sn) are preferably used. The stacked films of nickel (Ni) and tin (Sn) have sufficiently lower resistance than conductive resin such as silver paste, and also have high thermal resistance and high wettability with respect to solder.

With this configuration, the second conductor layers 47 to 49 are in direct contact with the second regions 41b to 43b of the through-hole conductors 41 to 43, thereby forming a current path that does not pass through the first conductor layers 44 to 46. Thus, as compared to a case where the entire upper surfaces of the through-hole conductors 41 to 43 are covered with the first conductor layers 44 to 46, DC resistance can be reduced.

As illustrated in FIG. 2, the through-hole conductors 41 and 42 are provided at corners of the coil component 10 that are adjacent to each other as viewed in the stacking direction. Magnetic members 13 and 14 constituted of the same material as that of the second magnetic material layer 12 are embedded in two corners located diagonally to the corners where the through-hole conductors 41 and 42 are provided. Further, a magnetic member 15 constituted of the same material as that of the second magnetic material layer 12 is embedded in inner diameter portions of the planar spiral conductors 21 and 22. The magnetic member 15 is provided to penetrate the inner diameter portions of the planar spiral conductors 21 and 22. The inner peripheral ends 21b and 22b provided in the inner diameter portions of the planar spiral conductors 21 and 22 are arranged to be offset to one side as viewed in the stacking direction (the upper left side in FIG. 2), and the magnetic member 15 is arranged to be offset to the other side as viewed in the stacking direction (the lower right side in FIG. 2). With this configuration, the distance between the through-hole conductors 41 and 42 and the through-hole conductor 43 increases, thereby preventing occurrence of short circuit therebetween.

The magnetic members 13 to 15 magnetically connect the first magnetic material layer 11 to the second magnetic material layer 12 via the through holes provided in the insulating layers 31 to 33, thereby functioning to form a closed magnetic circuit. The insulating layers 31 to 33 are formed of resin for example, and a non-magnetic material is preferably used at least for the insulating layer 32. Preferably, the insulating layer 32 has a thickness equal to or less than half the thickness of the planar spiral conductor 21 or 22. Thus, magnetic coupling can be adjusted while suppressing an increase in DC resistance.

The configuration of the coil component 10 according to the present embodiment is as described above. With this configuration, the through-hole conductor 41 and the through-hole conductor 43 are connected via the first planar spiral conductor 21. Similarly, the through-hole conductor 42 and the through-hole conductor 43 are connected via the second planar spiral conductor 22. Because the first and second planar spiral conductors 21 and 22 are magnetically coupled to each other in the stacking direction, when a current flows through one planar spiral conductor, a current also flows through the other planar spiral conductor due to electromotive force. At this time, because the first and second planar spiral conductors 21 and 22 are wound in opposite directions to each other, flowing directions of the currents are the same.

Figure 7:
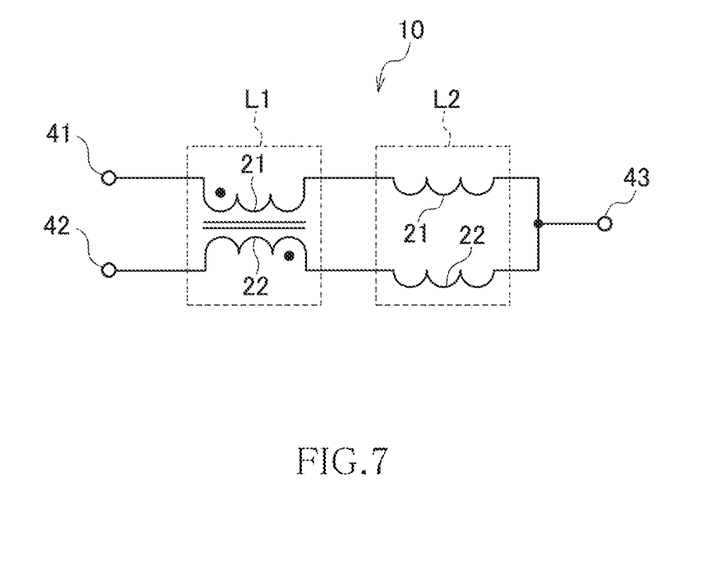
FIG. 7 is an equivalent circuit diagram of the coil component shown in FIG. 1.

FIG. 7 is an equivalent circuit diagram of the coil component 10 according to the present embodiment.

As illustrated in FIG. 7, the coil component 10 of the present embodiment has ideal transformer parts L1 that magnetically couple and leakage inductance components L2 that generate leakage flux. The ideal transformer parts L1 are components that magnetically couple in opposite directions to each other when the through-hole conductors 41 and 42 are assumed as an input side.

When the coil component 10 is used as a coupling inductor, a current is divided by the ideal transformer parts L1, and smoothed by the leakage inductance components L2. Therefore, in order to obtain desired properties, it is necessary to adjust a magnetic coupling rate to be low to some extent, and thereby ensure the leakage inductance components L2.

In the present embodiment, a magnetic coupling rate can be adjusted by the thickness of the insulating layer 32. This is because the first planar spiral conductor 21 and the second planar spiral conductor 22 are magnetically coupled to each other in the stacking direction. Thus, in order to have a low magnetic coupling rate, it suffices to increase the thickness of the insulating layer 32. The thickness of the insulating layer 32 does not affect the planar size of the coil component 10, and therefore adjusting the magnetic coupling rate does not cause enlargement of the planar size of the coil component 10.

In the present embodiment, because the first conductor layers 44 to 46 are formed on the upper surface of the magnetic material layer 12, the planar size of the bottom electrode can be larger than diameters of the through-hole conductors 41 to 43. When the diameters of the through-hole conductors 41 to 43 are large, the volume of the second magnetic material layer 12 decreases accordingly, making it difficult to obtain sufficient magnetic properties. In the present embodiment, however, the areas of the second conductor layers 47 to 49, which are the outermost layers of the bottom electrode, can be enlarged while the diameters of the through-hole conductors 41 to 43 are reduced. Thus, implementation reliability can be increased while desired magnetic properties are ensured.

The second conductor layers 47 to 49 have portions in contact with the through-hole conductors 41 to 43 without interposition by the first conductor layers 44 to 46, and therefore an increase in DC resistance can be suppressed even when respective resistance of the first conductor layers 44 to 46 are relatively high. Further, in the present embodiment, the second regions 41b and 42b are arranged closer to an edge (an end of the magnetic material layer 12 as viewed in the stacking direction) than the first regions 41a and 42a. Therefore, the first conductor layers 44 and 45 are not interposed in the portion corresponding to the shortest route of a current path through which a current I flows after the coil component is implemented. This facilitates concentration of the current I to portions where the first conductor layers 44 and 45 are not interposed, thereby making it possible to suppress an increase in DC resistance even when the first conductor layers 44 and 45 have relatively high resistance.

Further, because the coil component 10 according to the present embodiment has three external terminals, an eddy current loss caused by a terminal part is small. In the present embodiment, the through-hole conductors 41 and 42 have a substantially rectangular planar shape, and the magnetic member 15 is laid out at a position in a long-side direction. As compared to a case where the magnetic member 15 is laid out at a position in a short-side direction, magnetic flux that interferes with the through-hole conductors 41 and 42 is reduced. Thus, an eddy current loss caused by the through-hole conductors 41 and 42 can also be reduced. Because the coil component 10 has a configuration in which the bottom electrode is formed on the upper surface of the magnetic material layer 12 instead of employing an L-shaped terminal electrode similar to that of a typical coil component, DC resistance due to an L-shaped terminal electrode does not increase. Further, because an external terminal is not exposed on a side surface of the coil component 10, there is also an advantage that short circuit with other adjacent components hardly occurs even in a case of high-density implementation on a printed circuit board.

A manufacturing method of the coil component 10 according to the present embodiment is described next.

FIGS. 8A to 8G are plan pattern views for describing a manufacturing process of the coil component 10 according to the present embodiment.

Figure 8A:
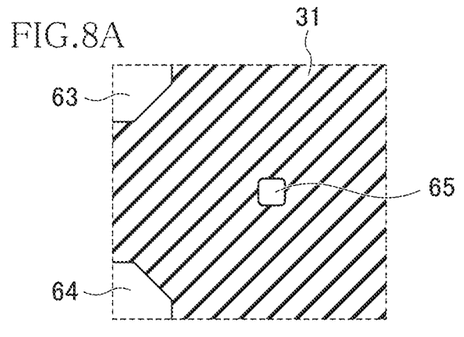
FIGS. 8A to 8H are plan pattern views for describing a manufacturing process of the coil component shown in FIG. 1.

First, the magnetic material layer 11 formed of sintered ferrite and the like with a predetermined thickness is prepared, and the insulating layer 31 is formed on an upper surface thereof with a pattern illustrated in FIG. 8A. Specifically, a resin material is applied on an upper surface of the magnetic material layer 11 by spin coating, and thereafter a predetermined pattern is formed by photolithography method. Through holes 63 to 65 illustrated in FIG. 8A are spaces where the magnetic members 13 to 15 are embedded later.

Figure 8B:
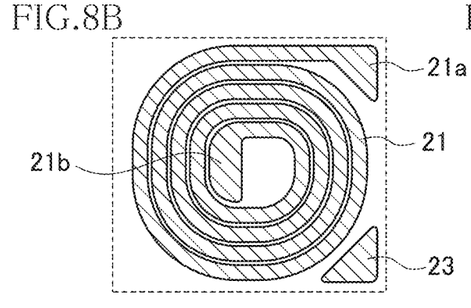

Next, as illustrated in FIG. 8B, the first planar spiral conductor 21 and the connecting conductor 23 are formed on an upper surface of the insulating layer 31. Preferably, the method of forming these conductors is such that a base metal film is formed by using a thin-film process such as sputtering, and thereafter growing plating to a desired thickness by using electrolytic plating.

Figure 8C:
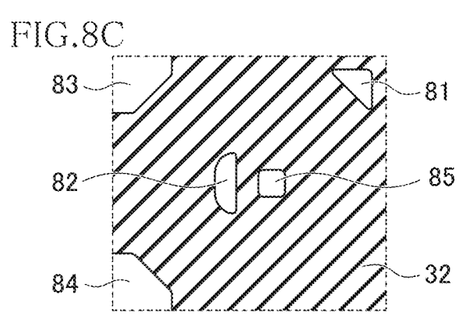

Next, as illustrated in FIG. 8C, the insulating layer 32 is formed on the upper surface of the insulating layer 31, so as to cover the first planar spiral conductor 21 and the connecting conductor 23. The method of forming the insulating layer 32 is such that a resin material is applied by spin coating, and thereafter a predetermined pattern is formed by photolithography method, similarly to the method of forming the insulating layer 31. Through holes 81 and 82 illustrated in FIG. 8C are formed at positions where the outer peripheral end 21a and the inner peripheral end 21b of the spiral conductor 21 are exposed, respectively. Through holes 83 to 85 are spaces where the magnetic members 13 to 15 are embedded later.

Figure 8D:
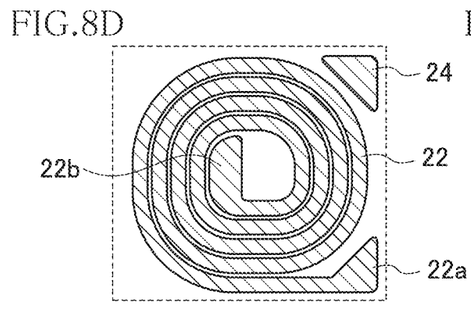

Next, as illustrated in FIG. 8D, the second planar spiral conductor 22 and the connecting conductor 24 are formed on an upper surface of the insulating layer 32. Thus, an inner peripheral end 22b of the planar spiral conductor 22 is connected to the inner peripheral end 21b of the planar spiral conductor 21 via the through hole 82. The connecting conductor 24 is connected to the outer peripheral end 21a of the planar spiral conductor 21 via the through hole 81. The method of forming these conductors is as described above.

Figure 8E:
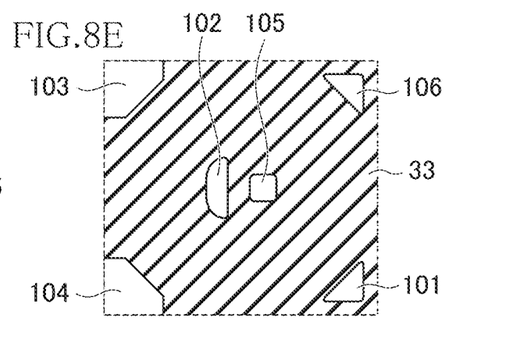
Figure 8F:
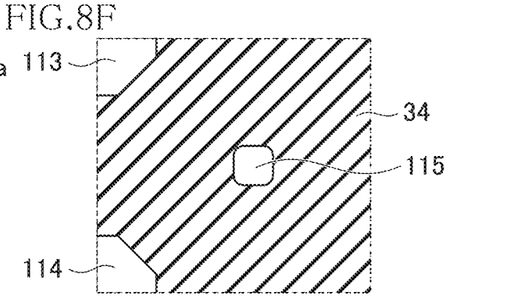

Next, as illustrated in FIGS. 8E and 8F, the insulating layer 33 and a mask 34 for ion milling are formed in this order on the upper surface of the insulating layer 32, so as to cover the second planar spiral conductor 22 and the connecting conductor 24. The method of forming them is similar to that of forming the insulating layers 31 and 32. Through holes 101 and 102 illustrated in FIG. 8E are formed at positions where the outer peripheral end 22a and the inner peripheral end 22b of the planar spiral conductor 22 are exposed, respectively. A through hole 106 is formed at a position where the connecting conductor 24 is exposed. Through holes 103 to 105 are spaces where the magnetic members 13 to 15 are embedded later. Through holes 113 to 115 illustrated in FIG. 8F are formed at positions where the magnetic members 13 to 15 are embedded later.

Figure 8G:
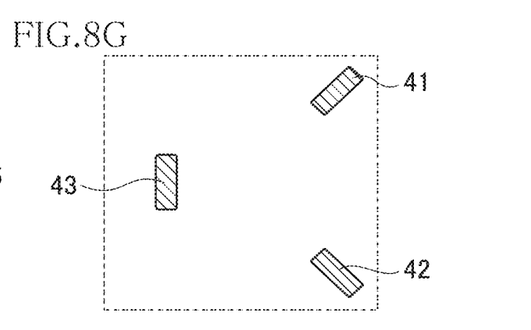

In this state, by performing ion-milling with the mask 34 for ion milling in ranges of the through holes 113 to 115, corresponding portions of the insulating layers 31 to 33 are removed, and the magnetic material layer 11 is exposed at these positions. Next, the mask 34 for ion milling is removed, and thereafter, as illustrated in FIG. 8G, the through-hole conductors 41 to 43 are formed on an upper surface of the insulating layer 33. Thus, the through-hole conductor 41 is connected to the connecting conductor 24 via the through hole 106, the through-hole conductor 42 is connected to the outer peripheral end 22a of the planar spiral conductor 22 via the through hole 101, and the through-hole conductor 43 is connected to the inner peripheral end 22b of the planar spiral conductor 22 via the through hole 102. The method of forming these conductors is as described above.

Next, resin containing a magnetic material is formed on the entire surface. Thus, the resin containing the magnetic material flows into recesses formed by removing corresponding portions of the insulating layers 31 to 33, thereby forming the magnetic members 13 to 15 and forming the magnetic material layer 12 that covers the upper surface of the insulating layer 33. Thereafter, the magnetic material layer 12 is ground until upper surfaces of the through-hole conductors 41 to 43 are exposed.

Figure 8H:
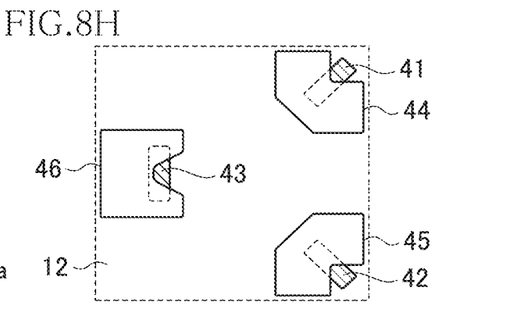

Next, as illustrated in FIG. 8H, the first conductor layers 44 to 46 are formed on the upper surface of the magnetic material layer 12. As described above, the first conductor layers 44 to 46 are formed to cover the first regions 41a to 43a of the through-hole conductors 41 to 43 without covering the second regions 41b to 43b. When conductive resin such as silver paste is used for the first conductor layers 44 to 46, they can be formed by thick-film processing such as screen printing.

The magnetic material layer 11 as a substrate is ground to a desired thickness, and thereafter the second conductor layers 47 to 49 are formed to cover the first conductor layers 44 to 46 and the second regions 41b to 43b of the through-hole conductors 41 to 43, thereby completing the coil component 10 according to the present embodiment. The second conductor layers 47 to 49 can be formed by forming layers of nickel (Ni) and tin (Sn) in this order by barrel plating.

In this manner, in the coil component 10 according to the present embodiment, because the planar spiral conductors 21 and 22 are formed by using a thin-film process and electrolytic plating, a very precise pattern can be formed as compared to a case where windings are formed with a wire or foil.

Further, because the first conductor layers 44 to 46 and the second conductor layers 47 to 49 are formed by performing screen printing and barrel plating in this order, a patterning process is not required for these conductor layers 44 to 49.

It is apparent that the present invention is not limited to the above embodiments, but may be modified and changed without departing from the scope and spirit of the invention.

Figure 9:
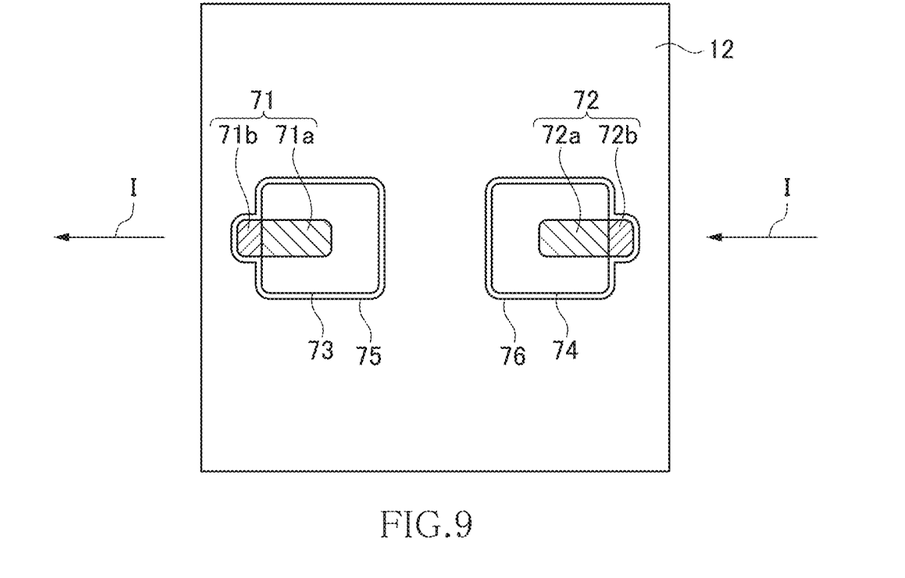
FIG. 9 is a perspective plan view for describing the layout of a bottom surface of the coil component according to a modification.

In the embodiment described above, while a case of applying the present invention to a three-terminal type coupling inductor has been described by way of example, application of the present invention is not limited thereto. Therefore, the present invention can be applied to a two-terminal type inductance element as illustrated in FIG. 9, which is a perspective plan view. The inductance element illustrated in FIG. 9 has two through-hole conductors 71 and 72, first conductor layers 73 and 74 that cover first regions 71a and 72a of the through-hole conductors 71 and 72, respectively, and second conductor layers 75 and 76 that cover second regions 71b and 72b of the through-hole conductors 71 and 72 and the first conductor layers 73 and 74, respectively. Also in the example illustrated in FIG. 9, the second regions 71b and 72b are arranged closer to an edge (an end of the magnetic material layer 12 as viewed in a stacking direction) than the first regions 71a and 72a, which facilitates concentration of a current I to portions where the first conductor layers 73 and 74 are not interposed, thereby making it possible to suppress an increase in DC resistance even when the first conductor layers 73 and 74 have relatively high resistance.

Figure 10:
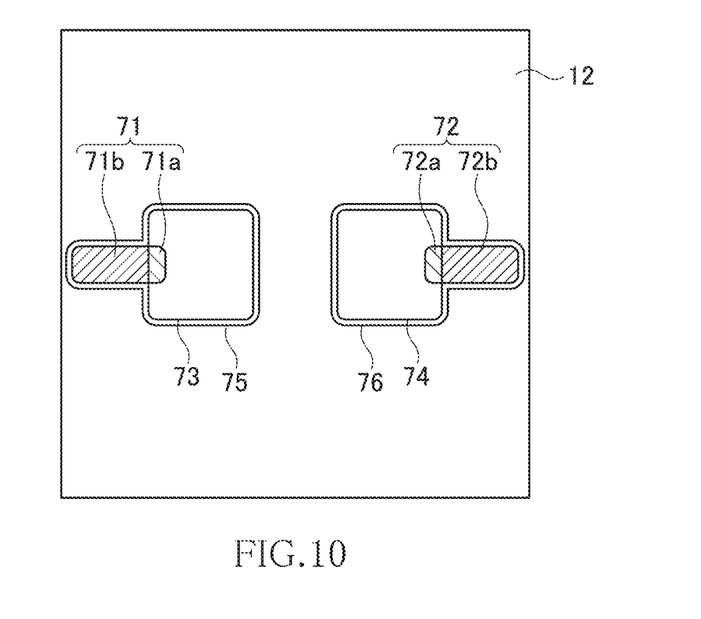
FIG. 10 is a perspective plan view for describing the layout of a bottom surface of the coil component according to another modification.
Figure 11:
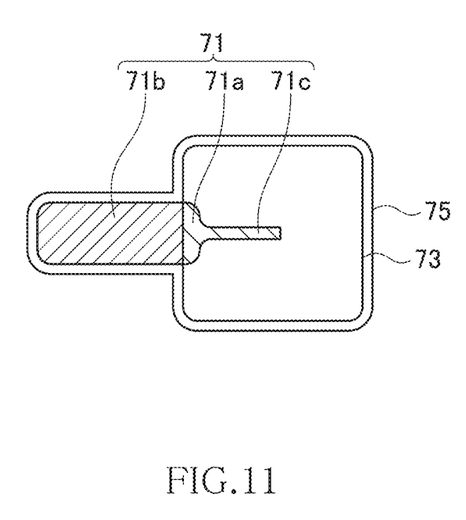
FIG. 11 is a perspective plan view for describing the shape of a bottom electrode according to a still another modification.

In order to further reduce DC resistance, as illustrated in FIG. 10, it is also preferable that areas of the second regions 71b and 72b are designed larger than areas of the first regions 71a and 72a. However, when the areas of the first regions 71a and 72a are too small, there is a concern such that the through-hole conductors 71 and 72 and the first conductor layers 73 and 74 separate from each other due to displacement in alignment. In order to prevent this problem, as in an example illustrated in FIG. 11, an elongated branch 71*c* is preferably provided in the first region 71*a* (72*a*) of each through-hole conductor.

What is claimed is:

1. A coil component comprising:
  a spiral conductor;
  a magnetic material layer covering the spiral conductor and having a through hole exposing an end of the spiral conductor;
  a through-hole conductor embedded in the through hole and has first region and second regions that are exposed from the magnetic material layer;
  a first conductor layer formed on an upper surface of the magnetic material layer and covering the first region of the through-hole conductor without covering the second region; and
  a second conductor layer covering the first conductor layer and the second region of the through-hole conductor,
  wherein the second conductor layer has a lower resistance than the first conductor layer.

2. The coil component as claimed in claim 1, wherein the first conductor layer has higher flexibility than the second conductor layer.

3. The coil component as claimed in claim 2, wherein the first conductor layer comprises a conductive resin.

4. The coil component as claimed in claim 3, wherein the magnetic material layer comprises a resin containing a magnetic material.

5. The coil component as claimed in claim 1, wherein the second conductor layer is constituted of stacked films of nickel (Ni) and tin (Sn).

6. The coil component as claimed in claim 1, wherein the second region has a larger area than the first region.

7. The coil component as claimed in claim 1, wherein the second region is located closer to an end of the magnetic material layer than the first region as viewed in a stacking direction.

8. The coil component as claimed in claim 1,
  wherein the spiral conductor includes a first planar spiral conductor and a second planar spiral conductor that is stacked on the first planar spiral conductor and wound in an opposite direction to a winding direction of the first planar spiral conductor, and
  wherein the through-hole conductor includes a first through-hole conductor connected to an outer peripheral end of the first planar spiral conductor, a second through-hole conductor connected to an outer peripheral end of the second planar spiral conductor, and a third through-hole conductor connected in common to inner peripheral ends of the first and second planar spiral conductors.

9. The coil component as claimed in claim 8,
  wherein the inner peripheral ends of the first and second planar spiral conductors overlap as viewed in a stacking direction, and
  wherein the inner peripheral ends of the first and second planar spiral conductors are coupled to each other in the stacking direction at overlapped positions.

10. The coil component as claimed in claim 9, wherein the third through-hole conductor overlaps at least partially with the inner peripheral ends of the first and second planar spiral conductors as viewed in the stacking direction.

* * * * *